(12) United States Patent
Scherer et al.

(10) Patent No.: US 10,488,256 B2
(45) Date of Patent: Nov. 26, 2019

(54) SPECTRAL FILTER HAVING CONTROLLABLE SPECTRAL BANDWIDTH AND RESOLUTION

(71) Applicant: California Institute of Technology, Pasadena, CA (US)

(72) Inventors: Axel Scherer, Barnard, VT (US); Taeyoon Jeon, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 15/990,114

(22) Filed: May 25, 2018

(65) Prior Publication Data
US 2018/0340826 A1    Nov. 29, 2018

Related U.S. Application Data

(60) Provisional application No. 62/597,223, filed on Dec. 11, 2017, provisional application No. 62/511,504, filed on May 26, 2017.

(51) Int. Cl.
| | | |
|---|---|---|
| *G01J 3/28* | (2006.01) | |
| *G01J 3/26* | (2006.01) | |
| *G01J 3/10* | (2006.01) | |
| *G01J 3/18* | (2006.01) | |
| *G01J 3/45* | (2006.01) | |

(52) U.S. Cl.
CPC .......... *G01J 3/26* (2013.01); *G01J 3/108* (2013.01); *G01J 3/1895* (2013.01); *G01J 3/45* (2013.01)

(58) Field of Classification Search
CPC ........ G01J 3/02; G01J 3/26; G01J 3/28; G01J 3/10; G01J 3/18; G01J 3/45; G01B 9/02
See application file for complete search history.

(56) References Cited

U.S. PATENT DOCUMENTS 6,597,490 B2 * 7/2003 Tayebati .............. G02B 26/001
359/291
7,817,281 B2 * 10/2010 Kiesel ..................... G01J 3/26
356/454

(Continued)

FOREIGN PATENT DOCUMENTS

| WO | 02/24570 A1 | 3/2002 |
| WO | 2005/124951 A1 | 12/2005 |
| WO | 2016/176735 A1 | 11/2016 |

OTHER PUBLICATIONS

Streubel et al., 'Fabrication of InP/air-gap distributed Bragg reflectors and microcavities', Feb. 1997; Elsevier; Materials Science and Engineering: B, pp. 364-367, vol. 44 / Issues 1-3, https://doi.org/10.1016/S0921-5107(96)01743-6.

(Continued)

*Primary Examiner* — Abdullahi Nur
(74) *Attorney, Agent, or Firm* — Kaplan Breyer Schwarz, LLP (57) ABSTRACT

A Fabry-Perot cavity-based spectral notch filter is disclosed, where the filter is operative for providing an output optical signal whose spectral content is spatially dispersed along at least one direction, while also controlling the spectral position and spectral range of the output light. In some embodiments, the spectral filter is integrated with a detector arrays to realize a compact, high-resolution spectrometer that can rapidly acquire the absorption spectrum of a sample with high sensitivity.

28 Claims, 8 Drawing Sheets

(56) References Cited

U.S. PATENT DOCUMENTS

| | | | |
|---|---|---|---|
| 8,649,097 B2 * | 2/2014 | Mitamura | G01J 3/02 |
| | | | 359/579 |
| 9,230,856 B2 | 1/2016 | Yeh et al. | |
| 9,268,144 B2 | 2/2016 | Rissanen et al. | |
| 9,638,913 B2 | 5/2017 | Kamal et al. | |

OTHER PUBLICATIONS

Prott et al., 'Modeling of Ultrawidely Tunable Vertical Cavity Air-Gap Filters and VCSELs', Jun. 19, 2003, IEEE Journal of Selected Topics in Quantum Electronics;, pp. 918-928, vol. 9/ Issue No. 3.

Ghaderi et al., 'Vapour HF release of airgap-based UV-visible optical filters', © 2015 Published by Elsevier Ltd.; Procedia Engineering 120 (2015), pp. 816-819.

Ford et al., 'Interference-Based Micromechanical Spectral Equalizers', Oct. 16, 2003, IEEE JSTQE on Optical Microsystems, pp. 1-8.

Authorized Officer Lee W. Young, International Search Report and Written Opinion dated Aug. 27, 2018 in International PCT Application No. PCT/US2018/034710.

Dolgin et al., "New Technology Report: Micromachined Tunable Filters for Optical Applications", Jun. 1, 1994, Jet Propulsion Laboratory.

Dolgin et al., "New Technology Report: Micromachined Optical Systems", Jun. 13, 1994, Jet Propulsion Laboratory.

* cited by examiner

FIG. 4B  Sectional view through line a-a

SPECTRAL FILTER HAVING CONTROLLABLE SPECTRAL BANDWIDTH AND RESOLUTION

RELATED APPLICATIONS

This application claims the benefit of U.S. Provisional Application No. 62/511,504 filed May 26, 2017 and U.S. Provisional Application No. 62/597,223, filed Dec. 11, 2017, each of which is incorporated herein by reference.

FIELD OF THE INVENTION

The present invention relates to spectral filters and, more particularly, to tunable spectral filters suitable for use in hyperspectral detectors and imaging systems.

BACKGROUND OF THE INVENTION

Spectral "notch" filters are optical devices operative for receiving a light signal characterized by a relatively wide spectral range and selectively passing only a relatively narrower range of wavelengths within the light signal. In other words, wavelengths outside of a "transmission window" of the notch filter are reflected or blocked in some manner, while wavelengths within the transmission window are transmitted through the device.

Of particular interest are tunable spectral filters, in which the center wavelength of the transmission window can be tuned over a spectral range. The tunability of such devices enables simplification of many optical systems and introduces the opportunity to tune complete optical systems. When a tunable spectral filter is operatively coupled with a broadband light source, for example, a narrow linewidth, wavelength-agile source can be realized. In similar fashion, a highly wavelength-selective detector results from the combination of a tunable spectral filter and a broadband detector. Tunable spectral filters have found widespread use in diverse applications, such as telecommunications, medical diagnostics (e.g., spectroscopy, optical coherence tomography (OCT), etc.), fluorescence microscopy, spectral or hyperspectral imaging, and environmental sensing, among others.

While tunable spectral filters have been developed based on a variety of different optical devices, such as liquid-crystal elements, fiber Bragg gratings, acousto-optic modulators, and surface-acoustic-wave (SAW) devices, perhaps the most commonly used is the tunable Fabry-Perot (FP) cavity.

A conventional tunable FP cavity includes a pair of parallel high-reflectivity mirrors that are closely spaced to give rise to an optically resonant cavity between them. The separation between the mirrors, referred to as the cavity length of the FP cavity, dictates what wavelengths pass through the cavity and what wavelengths are reflected by the cavity. Light having wavelength, $\lambda$, will resonate back and forth between the mirrors inside the optically resonant cavity when its cavity length, L, is equal to an integer number, N, of half-wavelengths (i.e., when $L=N\lambda/2$) and be transmitted through the cavity with low loss. At the same time, light characterized by other wavelengths will be reflected by the FP cavity. By changing the cavity length, therefore, the wavelength of light passed by the cavity can be adjusted.

Unfortunately, prior-art tunable spectral filters are often slow, have limited tuning range, cannot operate across a wide range of wavelengths, have poor spectral resolution, and/or are complex to implement in many optical systems.

SUMMARY

The teachings of the present disclosure enable optical systems having high spectral resolution over wide spectral ranges without some of the costs and disadvantages of the prior art. Systems in accordance with the present disclosure include Fabry-Perot cavity-based tunable filters that provide an optical output whose spectral content is spatially dispersed along at least one direction. Embodiments of the present invention are particularly well suited for use in hyperspectral imaging systems, hyperspectral detection systems, and high-resolution spectrometers.

Like the prior art, the present disclosure teaches a Fabry-Perot (FP) cavity comprising first and second planar mirrors that are highly reflective for a first light signal and form a high-finesse optically resonant cavity, where the separation between the mirrors (i.e., the cavity length of the FP cavity) is controllable. As a result, the FP cavity can function as a spectral notch filter having a very narrow transmission window that can be spectrally tuned over a wide wavelength range.

In marked contrast to the prior art, embodiments in accordance with the present disclosure include one planar mirror that can be tilted relative to the other planar mirror along at least a first direction to realize a cavity length having a linear gradient along that direction. At each point along the first direction, therefore, the FP cavity has a different cavity length and passes a different wavelength at that point.

By controlling the magnitude of the angle between the mirrors, the range of wavelengths transmitted over the width of the FP cavity is controlled. This enables control over the spectral resolution along the line. In some embodiments, the separation between the mirrors is also controlled, enabling control over both the absolute wavelengths and spectral range of the light passed through the FP cavity.

An illustrative embodiment of the present invention is a hyperspectral detection system that includes a spectral filter and a linear detector array. The spectral filter has a dispersive operation state in which it is operative for receiving a broadband optical signal and providing an output optical signal to the detector array, where the spectral content of the output optical signal is distributed along a line from a first side of the spectral filter to a second side of the spectral filter (i.e., along its width), and where the line is aligned with the elements of the detector array. As a result, each detector of the array receives a different wavelength signal in the spectral range of the output signal of the spectral filter.

The spectral filter is a tunable FP filter that includes a first planar mirror and a second planar mirror, each of which is highly reflective for an input light signal characterized by a first spectral range. The first and second mirrors define an optically resonant cavity having a uniform cavity length when the spectral filter is in its quiescent state.

The spectral filter also includes first and second vertical actuators that are operatively coupled to the first and second sides of the second mirror, respectively. Each vertical actuator controls the separation between the mirrors at its respective side of the cavity. As a result, the vertical actuators cooperatively control both the tilt of the second mirror, relative to the first mirror, as well as the vertical separation between the tilted second mirror and the first mirror.

In some embodiments, only the tilt of the second mirror is controlled and only one vertical actuator is necessary. In some embodiments, a rotary actuator (e.g., a rotary comb-drive actuator) is operatively coupled with the second mirror to control its tilt relative to the first mirror. In some of these embodiments, a vertical actuator controls the vertical position of the tilted second mirror as a whole.

In some embodiments, the tilt of the second mirror is controllable along a second direction that is orthogonal to the first direction, such as the depth of the optically resonant cavity. As a result, the spectral content of the output optical signal is distributed over a two-dimensional region.

An embodiment of the present invention is an apparatus comprising a spectral filter that is operative for receiving a first light signal characterized by a first spectral range and providing a second light signal that is spectrally dispersed along a first direction, wherein the second light signal is characterized by a second spectral range within the first spectral range, and wherein the spectral filter includes: a first mirror that is planar and partially transmissive for the first light signal; a second mirror that is planar and partially transmissive for the first light signal, wherein the first mirror and second mirror define an optically resonant cavity having a cavity length that is controllable along the first direction; and a first actuator that is configured to control a first separation between the first mirror and second mirror at a first location, wherein a first angle of the first mirror relative to the second mirror along the first direction is based on the first separation; wherein the second spectral range has a first spectral width that is based on the first angle.

Another embodiment of the present invention is an apparatus comprising a spectral filter that is operative for receiving a first light signal characterized by a first spectral range and providing a second light signal that is spectrally dispersed along a first direction, wherein the second light signal is characterized by a second spectral range within the first spectral range, and wherein the spectral filter includes: a first mirror that is planar and partially reflective for the first light signal; a second mirror that is planar and partially reflective for the first light signal, wherein the second mirror is moveable with respect to the first mirror, and wherein the second mirror is parallel with the first mirror when the spectral filter is in its quiescent state; and a first actuator that is configured to control a first angle between the first mirror and the second mirror along a first direction, wherein the second spectral range has a first spectral width that is based on the first angle.

Yet another embodiment of the present invention is a method comprising: (1) receiving a first light signal at a spectral filter that is characterized by a first spectral range, wherein the spectral filter includes: (i) a first mirror that is planar and partially transmissive for the first light signal; and (ii) a second mirror that is planar and partially transmissive for the first light signal, wherein the second mirror has a first angle relative to the first mirror along a first direction, and wherein the first angle is controllable; wherein the first and second mirror define an optically resonant cavity having a cavity length that is a first linear function of position along the first direction; (2) controlling the first angle such that it has a first magnitude; and (3) providing a second light signal from the spectral filter such that it is spectrally dispersed along the first direction, the second light signal being characterized by a second spectral range that is within the first spectral range, the second spectral range having a first spectral width that is based on the first magnitude.

DETAILED DESCRIPTION

Figure 1:
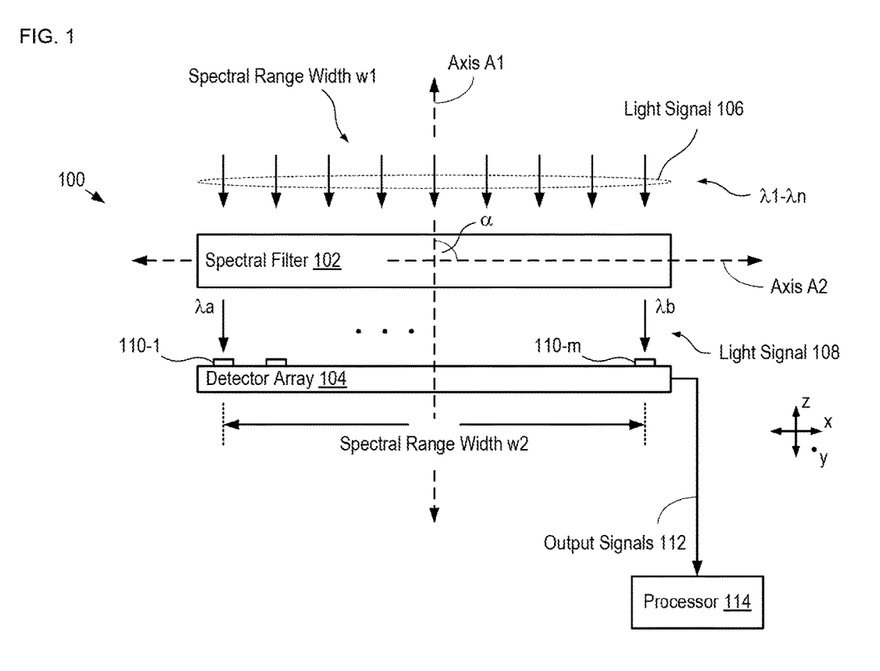
FIG. 1 depicts a schematic drawing of a hyperspectral detection system in accordance with an illustrative embodiment of the present invention.

FIG. 1 depicts a schematic drawing of a hyperspectral detection system in accordance with an illustrative embodiment in accordance with the present disclosure. System 100 includes spectral filter 102, detector array 104, and processor 114.

Spectral filter 102 is an FP-cavity-based spectral filter that is configured to receive input optical signal 106 and provide output optical signal 108, wherein input optical signal 106 propagates along axis A1 and is characterized by a first spectral range having width w1, and wherein output optical signal 108 is characterized by second spectral range having width w2, and further wherein the first spectral range includes the second spectral range. Furthermore, spectral filter 102 provides output optical signal 108 such that its spectral content is spatially dispersed along the x-direction, thereby imparting a spatial correlation on the spectral content of the output optical signal. Spectral filter 102 is characterized by longitudinal axis A2, which forms angle α with axis A1. In the depicted example, α is equal to 90° (i.e., light signal propagates along a direction that is normal to spectral filter 102).

Detector array 104 is a linear array of conventional detectors operative for detecting any wavelength included in input optical signal 106. Detector array 104 includes detectors 110-1 through 110-$m$ (referred to, collectively, as detectors 110) which provide output signals 112-1 through 112-$m$ (referred to, collectively, as output signals 112), respectively, to processor 114, where the magnitude of each output signal is based on the intensity of the light incident on its respective detector.

Processor 114 is a conventional processor comprising circuitry operative for receiving output signals 112-1 through 112-$m$, providing control signals to spectral filter 102, executing instructions, storing and retrieving data, and estimating spectral information, among other things.

Spectral filter 102 and detector array 104 are arranged such detectors 110 are aligned with the x-direction such that each of detectors 110 receives a different wavelength signal included in output optical signal 108. For the purposes of this Specification, including the appended claims, the term wavelength signal is defined as light signal whose spectral content is characterized by a center wavelength and a narrow spectral range that surrounds it.

In the depicted example, input optical signal is a broadband light signal that has a spectral content that spans the complete mid-infrared (MIR) spectral range and includes wavelength signals λ1 through λn. For the purposes of this Specification, including the appended claims, the MIR spectral range is defined as the wavelength range from 2 microns to 20 microns.

In operation, spectral filter 102 filters the spectral content of input optical signal 106 and provides output optical signal 108 such that it has a spectral range that is at least a portion of the spectral range of input optical signal 106. In other words, output optical signal 108 is characterized by spectral content that includes wavelength signals λa through λb, where a≥1 and b≤n, such that the wavelength signals are dispersed along the x-direction. As discussed below, spectral filter 102 is tunable such that it can control what portion of the spectral range of input optical signal is included in its output optical signal, as well as the spectral width of the output optical signal (i.e., the spectral range from λa to λb).

It should be noted, while the illustrative embodiment is configured for operation across the MIR spectral range, embodiments in accordance with the present disclosure can be configured to operate over virtually any wavelength range without departing from the scope of the present disclosure.

Figure 2A:
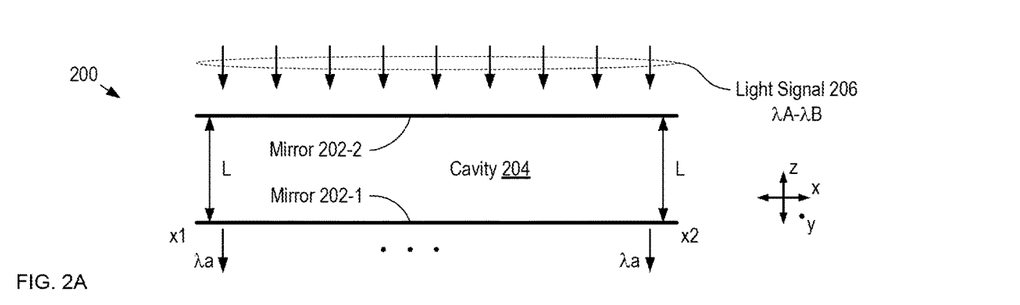
FIGS. 2A-B depict schematic drawings of cross-sectional views of an FP-cavity-based spectral filter in accordance with the prior art in different modes of operation.
Figure 2B:
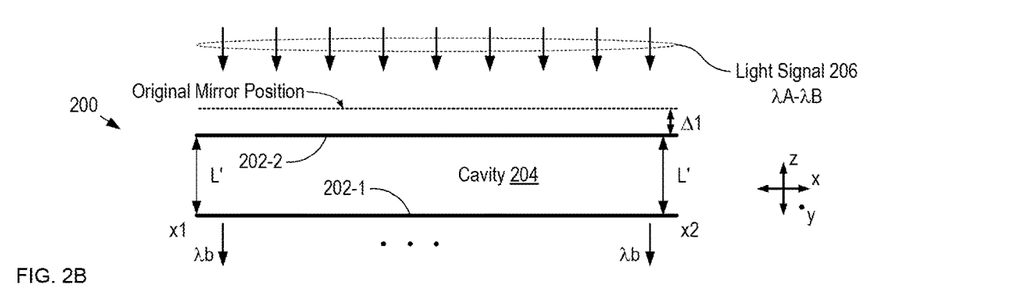

FIGS. 2A-B depict schematic drawings of cross-sectional views of an FP-cavity-based spectral filter in accordance with the prior art in different modes of operation.

Spectral filter 200 is a conventional FP-cavity-based device that includes parallel mirrors 202-1 and 202-2, which define optically resonant cavity 204 having a cavity length equal to the separation between the mirrors. The parallel nature of its mirrors enables spectral filter 200 to receive a multispectral input optical signal having a wide spectral range and pass an output optical signal containing only one narrow wavelength signal, where the spectral content of the output optical signal is uniform across the entire width of optically resonant cavity 204. By controlling the position of mirror 202-2 relative to mirror 202-1, the cavity length of spectral filter 200 is controlled, thereby enabling the wavelength signal passed by the spectral filter to be tuned over a desired tuning range.

In a first operational mode of spectral filter 200, depicted in FIG. 2A, mirrors 202-1 and 202-2 are parallel and separated by cavity length L across the width of optically resonant cavity 204 from first location x1 to second location x2. In this configuration, the spectral filter receives input optical signal 206, which includes the spectral range from λA to λB. Based on its cavity length of L, spectral filter 200 passes only wavelength signal λa within the spectral range of λA to λB.

In a second operational mode of spectral filter 200, depicted in FIG. 2B, the position of mirrors 202-1 is changed by distance Δ1 such that mirrors 202-1 and 202-2 are still parallel but separated by new cavity length L' across the width of optically resonant cavity 204 from first location x1 to second location x2. In this new configuration, the spectral filter passes only wavelength signal λb within the spectral range of λA to λB over the width of the optically resonant cavity.

In sharp contrast to the prior art, embodiments in accordance with the present disclosure control the angle of one of the mirrors of an FP cavity-based spectral filter relative to the plane of the other mirror of the cavity, thereby adding spectral dispersive capability to the device. By controlling both a tilt of one mirror as well as the separation between the two mirrors, the position and width of the spectral range passed by the spectral filter can be controlled, providing significant advantage over prior-art spectral filters.

Figure 3A:
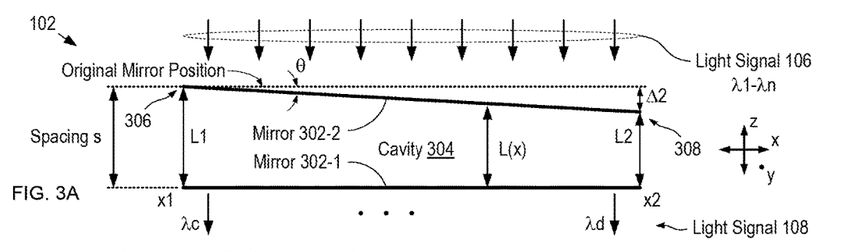
FIGS. 3A-C depict schematic drawings of cross-sectional views of an FP-cavity-based spectral filter in accordance with the present disclosure in different exemplary modes of operation.
Figure 3B:
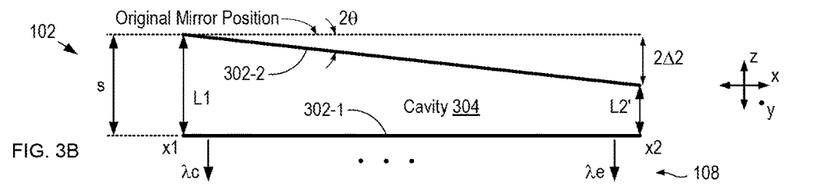
Figure 3C:
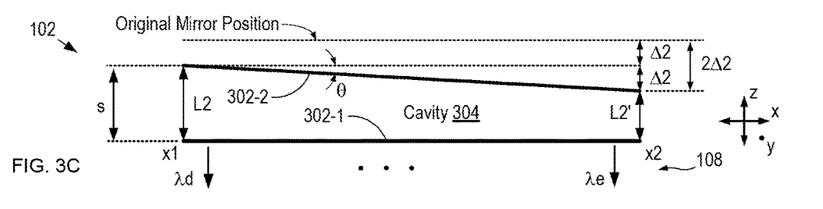

FIGS. 3A-C depict schematic drawings of cross-sectional views of an FP-cavity-based spectral filter in accordance with the present disclosure in different exemplary modes of operation.

Spectral filter 102 includes planar mirrors 302-1 and 302-2, which define optically resonant cavity 304 (hereinafter referred to as "cavity 304") whose cavity length is L1 when the spectral filter is in its quiescent state. As discussed in more detail below, mirror 302-2 is operatively coupled with a pair of vertical actuators, one of which is operative for controlling the height of first end 306 of mirror 302-2 at location x1, and the other of which is operative for controlling the height of second end 308 of mirror 302-2 at location x2. As a result, the angle of mirror 302-2 relative to mirror 302-1 can be controlled to realize a cavity length having a linear gradient, L(x), along the width of cavity 304. Furthermore, since the position of each of ends 306 and 308 is controlled, by adjusting both actuators, the separation between tilted mirror 302-2 and stationary mirror 302-1 can be controlled.

FIG. 3A depicts spectral filter 102 in a first configuration wherein second end 308 has been moved toward mirror 302-1 by a distance Δ2 while first end 306 remains in its quiescent position. As a result, mirror 302-2 is tilted at angle θ relative to mirror 302-1. Since first end 306 remains in its original position, the cavity length at location x1 remains L1, while the cavity length at location x2 is reduced to L2.

Since the separation between mirrors 302-1 and 302-2 is non-uniform along the width of cavity 304, the separation between them at location x1 is designated herein as spacing s. It will be appreciated by one skilled in the art that any point along cavity 304 (e.g., the separation at location x2, the spacing in the center of cavity 304, etc.) can be used as a reference for this spacing, however.

Due to its cavity length of L1 at x1, cavity 304 passes wavelength signal λc of light signal 106 at location x1. In similar fashion, due to its cavity length of L2 at x2, the wavelength signal of light signal 106 passed by cavity 304 reduces to λd at location x2. From x1 to x2, cavity 304 passes a set of wavelength signals whose wavelengths decrease linearly from λc to λd according to cavity length L(x).

FIG. 3B depicts spectral filter 102 in a second configuration wherein second end 308 has been moved toward mirror 302-1 by twice the distance as that shown in FIG. 3A (i.e., by 2Δ2), while first end 306 remains in its quiescent position. As a result, mirror 302-2 is tilted at angle 2θ relative to mirror 302-1. Since first end 306 remains in its original position, the cavity length at location x1 remains L1, while the cavity length at location x2 is decreased to L2'. As a result, in the second configuration, cavity 304 passes wavelength signals within the range of λc to λe, which are spatially dispersed along the line from location x1 to location x2.

It should be noted that, since the change in cavity length across the width of cavity 304 in the second configuration is twice the magnitude of the change in cavity length in the first configuration, the spectral range passed in the second configuration is twice as wide as the spectral range passed in the first configuration. As a result, the spectral resolution attainable in the first configuration is twice the spectral resolution in the second configuration.

FIG. 3C depicts spectral filter 102 in a third configuration wherein second end 308 has been moved to effect a tilt of θ on mirror 302-1 while also reducing the separation of the mirrors by distance Δ2). As a result, the cavity length at location x1 is L2, while the cavity length at location x2 is L2'. As a result, in the third configuration, cavity 304 passes wavelength signals within the range of λd to λe, which are spatially dispersed along the line from location x1 to location x2.

As evinced by FIGS. 3A-C, embodiments in accordance with the present disclosure can control either or both of the spectral range and spectral resolution of optical output signal 108 over a wide range (subject to the limitations of the actuators used). It should be noted that, by sequentially implementing the first and third configurations described above, the spectral range obtained for light signal 108 via the second configuration can be obtained—but with twice the resolution. Furthermore, by setting the tilt angle of mirror 302-2 to realize a high-spectral resolution output over a narrow spectral range and changing the separation between mirrors 302-1 and 302-2 N times, N high-resolution sub-spectra within the spectral range of input light signal 106 can be obtained. In fact, in some embodiments, the entire spectral range of input light signal 106 can be scanned with high-resolution in such a manner by judicious selection of the tilt angle, the width of each spectral sub-range, and the value of N.

The structure of mirrors 302-1 and 302-2 (referred to, collectively, as mirrors 302) can take many forms, including first surface reflectors, Bragg reflectors, and the like, without departing from the scope of the present disclosure. Typically, the structure of mirrors 302 is dictated by the wavelength of light over which spectral filter 102 is intended to operate. For operation in the MIR spectral range, for example, it can be advantageous to employ mirrors that are Bragg reflectors comprising a plurality of high-refractive-index structural material that are separated by air gaps.

Figure 4A:
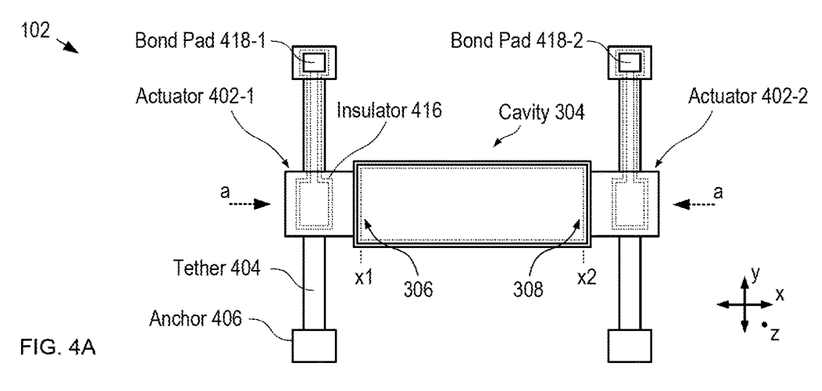
FIGS. 4A-B depict schematic drawings of top and sectional views of a spectral filter in accordance with the illustrative embodiment.
Figure 4B:
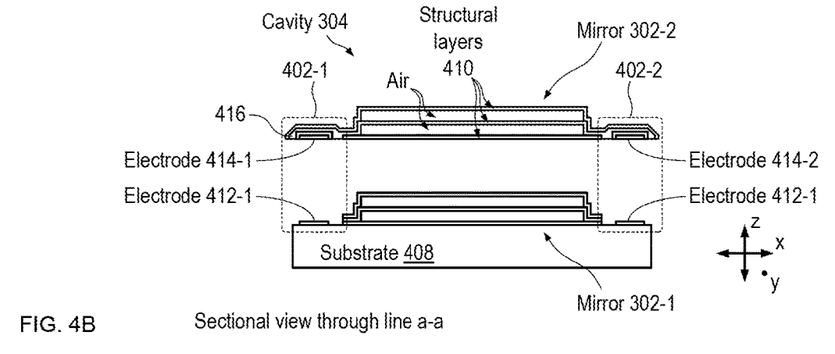

FIGS. 4A-B depict schematic drawings of top and sectional views of a spectral filter in accordance with the illustrative embodiment. Spectral filter 102 includes cavity 304, actuators 402-1 and 402-2, tethers 404, and anchors 406. The sectional view shown in FIG. 4B is taken through line a-a depicted in FIG. 4A.

As discussed above, cavity 304 includes mirrors 302-1 and 302-2, each of which is highly reflective for input optical signal 106.

Mirror 302-1 is a stationary Bragg reflector disposed on the surface of substrate 408. In the depicted example, substrate 408 is a conventional silicon substrate; however, a wide variety of materials can be used in substrate 408 without departing from the scope of the present invention.

Mirror 302-2 is suspended above mirror 302-1 via tethers 404, which extend between each of actuators 402-1 and 402-2 and anchors 406.

In the depicted example, each of mirrors 302 is a multi-layer Bragg reflector designed to realize high-reflectivity (>99.9999%) over the entire MIR spectral range. Each of mirrors 302 includes a plurality of structural layers 410 having a relatively higher refractive index and a plurality of air layers that function as relatively lower-refractive index layers in the Bragg reflector structure. The structural layers and air layers alternate such that adjacent structural layers are separated by an air layer. In the depicted example, each mirror includes three structural layers made of low-residual-stress amorphous silicon having a refractive index of approximately 3.5 and a thickness of approximately 785 nm (approximately ¼ of the center wavelength of the MIR spectral range as measured in the material of the structural layer). Adjacent structural layers are separated by an air gap having a thickness of approximately 2.75 microns (approximately ¼ of the center wavelength of the MIR spectral range in air). It should be noted that the materials and design parameters provided for mirrors 302 are merely exemplary and that myriad alternative designs for the mirrors of spectral filter 102 are within the scope of the present disclosure.

Each of actuators 402-1 and 402-2 (referred to, collectively, as actuators 402) is a vertical electrostatic actuator that includes a fixed electrode disposed on substrate 408 and a movable electrode that is affixed to mirror 302-2. Specifically, actuator 402-1 includes fixed electrode 412-1 and movable electrode 414-1, while actuator 402-2 includes fixed electrode 412-2 and moveable electrode 414-2.

Actuator 402-1 controls the cavity length at location x1 based on a voltage applied between electrodes 412-1 and 414-1. In similar fashion, actuator 402-2 controls the cavity length at location x2 based on a voltage applied between electrodes 412-1 and 414-1. In the depicted example, an applied voltage of approximately 10 V is sufficient to fully actuate each of actuators 402-1 and 402-2.

Electrodes 412-1 and 412-2 are regions of doped amorphous silicon that are electrically connected with substrate 408, which is connected to electrical ground. In some embodiments, electrodes 412-1 and 412-2 are electrically isolated from the substrate by layer of dielectric, such as silicon nitride, to enable them to be independently driven.

Electrodes 414-1 and 414-2 are regions of doped amorphous silicon that are disposed on the bottom surface of mirror 302-2. Electrodes 414-1 and 414-2 are electrically connected to bond pads 418-1 and 418-2, respectively, via electrical traces of doped amorphous silicon that run along the underside of tethers 404.

Tethers 404 are beams of amorphous silicon having a cross-sectional shape that substantially selectively enables flexure of the tethers out of the x-y plane, while substantially inhibiting their flexure within the x-y plane. It should be noted that, while the depicted example includes tethers that are simple straight beams, myriad tether designs can be used in spectral filter 102 without departing from the scope of the present invention. Tethers suitable for use in spectral filter 102 include, without limitation, serpentine springs, folded-beam tethers, and the like. It should be further noted that the actuation voltage required to configure spectral filter 102 is significantly affected by the design of tethers 404.

Anchors 406 are stationary, mechanically robust projections that extend vertically from the top surface of substrate 408.

Bond pads 418-1 and 418-2 are formed on the top of their respective anchors 406 by opening a window to the material of tethers 404 and depositing metal into the openings (typically via a shadow-mask process).

Each of electrodes 414-1 and 414-2, as well as their respective traces is electrically isolated from the structural material of mirror 302-2 via a thin layer of dielectric 416 so that each of electrodes 414-1 and 414-2 can be individually addressed. In the depicted example, dielectric 416 is silicon nitride, which is substantially unaffected by the etchant used to release mirror 302-2 from substrate 408, as discussed below.

It should be noted that actuators 402-1 and 402-2, and their arrangement in spectral filter 102, represents merely one example of a suitable actuation scheme for the spectral filter. Suitable alternative actuation includes vertical comb-drive actuators (which could be disposed on either sides of mirror 302-2, or elsewhere), rotary comb-drive actuators (disposed at the center of the top and bottom edges, or disposed at either side, of mirror 302-2), thermal actuators, magnetostrictive actuators, non-micromechanical actuators, and the like.

While the depicted example is a spectral filter that spatially disperses the spectral content of its output optical signal along one dimension, alternative embodiments within the scope of the present disclosure include spectral filters that disperse the spectral content of their output optical signals along two lateral directions, such as the x- and y-directions. To realize such a spectral filter, one or more additional actuators arranged along the y-direction can be used. Alternatively, two-axis gimbal structures, such as those used for two-axis beam-steering mirrors known in the prior art, can be employed to provide two-dimensional orientation control of mirror 302-2.

Figure 5A:
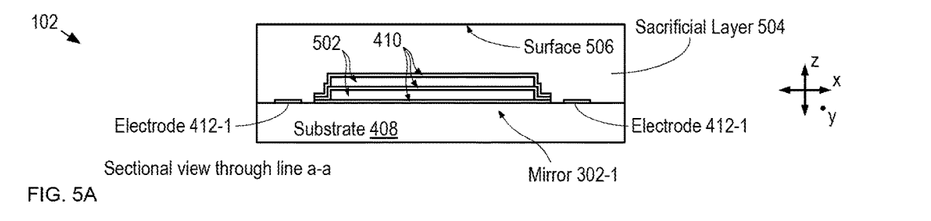
FIGS. 5A-C depict schematic drawings of cross-sectional views of spectral filter 102 at different stages of its fabrication in accordance with the illustrative embodiment.
Figure 5B:
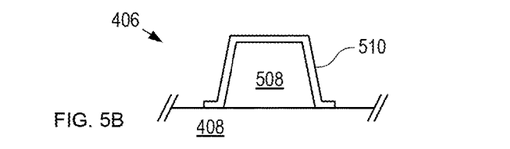
Figure 5C:
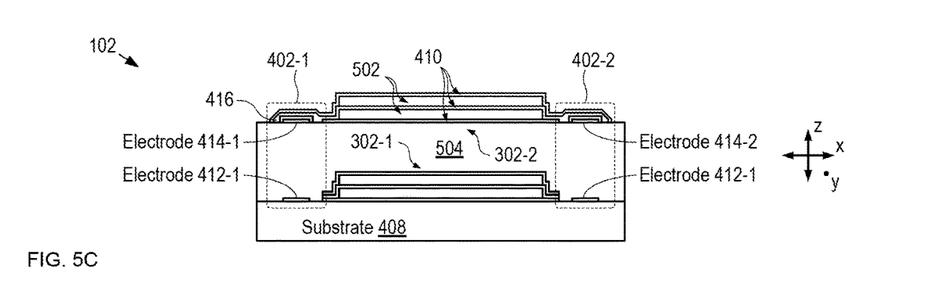

FIGS. 5A-C depict schematic drawings of cross-sectional views of spectral filter 102 at different stages of its fabrication in accordance with the illustrative embodiment. The method described herein employs conventional surface micromachining processes developed within the Micro Electro Mechanical Systems (MEMS) technology realm.

The fabrication of spectral filter 102 begins with formation of a layer of doped, low-residual stress amorphous silicon on the top surface of substrate 408. This layer is then patterned to define the first structural layer 410 in mirror 302-1, as well as electrodes 412-1 and 412-2.

Successive deposition and patterning of sacrificial layers 502 and structural layers 410 is then performed. In the depicted example, sacrificial layers 502 comprise borophosphosilicate glass (BPSG) and structural layers 410 comprise doped, low-residual stress amorphous silicon. The layer structure of sacrificial and structural layers defines the nascent Bragg reflector stack of mirror 302-1.

Sacrificial layer 504 is then formed over the entire surface of the substrate to encase mirror 302-1 and electrodes 412-1 and 412-2 in sacrificial material.

FIG. 5A depicts a cross-sectional view of nascent spectral filter 102 after formation of sacrificial layer 504.

Sacrificial layer 504 is then patterned to define pedestals 508, which function as the core of anchors 406.

The first (bottom-most) structural layer 410 of mirror 302-2 is then formed on surface 506 and over pedestals 508. This structural layer is then patterned to define the bottom-most layer of mirror 302-2, electrodes 414-1 and 414-2 and their respective traces, and outer shell 510 of anchors 406.

FIG. 5B depicts a cross-sectional view of an anchor 406 after formation of the first structural layer 410 of mirror 302-2.

Successive deposition and patterning of sacrificial layers 502 and structural layers 410 is then performed again to complete the nascent Bragg reflector stack of mirror 302-2, as well as tethers 406.

FIG. 5C depicts a cross-sectional view of nascent spectral filter 102 after formation of the layer structure of mirror 302-2.

The nascent structure of spectral filter 102 is then completed by forming vias to expose the top surface of shell 510 for the anchors that are electrically connected to electrodes 414-1 and 414-2.

To release mirror 302-2 and tethers 406 from substrate 408, thereby making them mechanically active, nascent filter 102 is subjected to a release etch in hydrofluoric acid to remove all regions of sacrificial material 502 except for pedestals 508, which are protected from attack by shells 510.

After the release etch, metal is deposited using a shadow-mask deposition to form bond pads 418-1 and 418-2.

It should be noted that the materials and structure of spectral filter 502 are merely exemplary and that many suitable combinations of structural and sacrificial materials can be used without departing from the scope of the present invention.

Furthermore, many alternative methods for forming spectral filter 102 exist within the scope of the present disclosure. Other exemplary methods include fabrication of each mirror structure on separate substrates and then joining the substrates to form an FP cavity. In some embodiments, separate substrates comprising the mirrors are joined using a resilient material (e.g., Polydimethylsilicone (PDMS), etc.) that enables the use of mechanical force (e.g., clamping, pneumatic or hydraulic actuation, screws, etc.) to compress one or both sides of an FP cavity to induce a desired tilt and/or mirror separation.

Furthermore, in some fabrication methods suitable for forming spectral filter 102, an air-layer-based Bragg reflector is formed by etching an arrangement of holes through the structural-material layers and sacrificial-material layers of at least one of nascent mirrors 302. Once the holes are formed through the layer stack, a timed sacrificial etch is used to laterally etch most, but not all, of the sacrificial material layers. As a result, when the timed etch is finished, small regions of sacrificial material remain, which function to hold the structural-material layers in their desired spatial relationship.

As described above, the cavity length at both ends of cavity 304 can be controlled; therefore, each of the shortest and longest wavelengths in the spectral content of output optical signal 106 can be independently controlled. This affords spectral measurement methods are not practical, or in some cases, possible, using prior art hyperspectral measurement systems. Two examples of spectral measurement methods in accordance with the present disclosure are described here.

Figure 6:
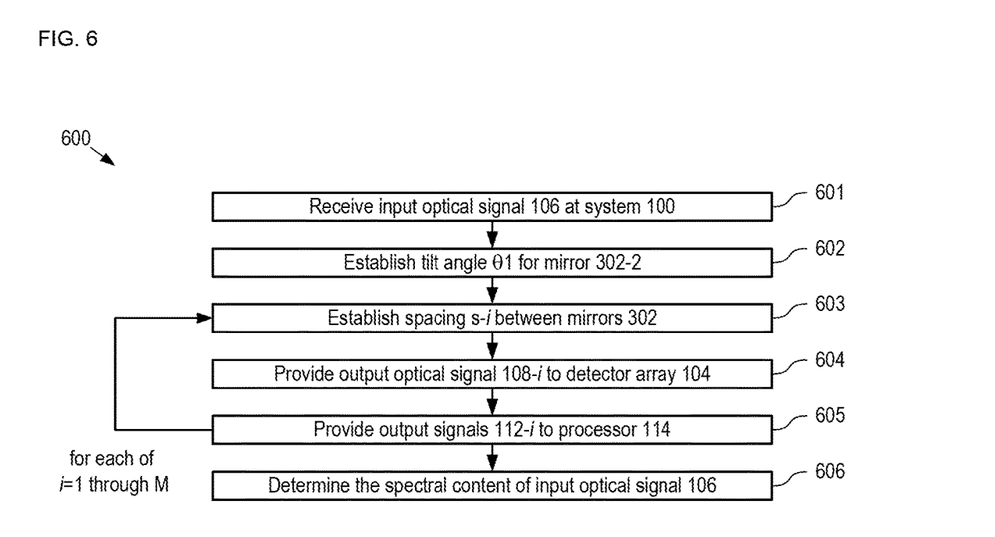
FIG. 6 depicts operation of a first exemplary method for determining the spectral content of a light signal in accordance with the present invention.

FIG. 6 depicts operation of a first exemplary method for determining the spectral content of a light signal in accordance with the present invention. Method 600 is described herein with continuing reference to FIGS. 1, 3, and 4. Method 600 begins with operation 601, wherein input optical signal 106 is received by hyperspectral detection system 100.

As noted above, in the depicted example, input optical signal 106 spans the wavelength range from 2 microns to 20 microns. For the purposes of the exemplary methods described here, the quiescent cavity length of cavity 304 passes light whose wavelength is equal to 20 microns and detector array 104 includes 1000 detectors 110, which are equally spaced along the x-direction.

At operation 602, mirror 302-2 is tilted by angle θ1 without changing the separation of mirrors 302 at location x1. The magnitude of θ1 is selected such that the spectral width of output optical signal 108 is 1 micron. As a result, output optical signal 108 has a spectrum that spans the wavelength range from 20.0 microns to 19.001 microns.

For each of I=1 through M, wherein M is the number of sub-spectra of light signal 106 to be measured (M=18 in the present example):

At operation 603, spacing s-i is established to set the spectral position of the spectrum of output optical signal 108-$i$. Each time the value of i is indexed, the value of s-i is changed by an amount suitable to change the spectral position of the spectrum of output optical signal 108-$i$ by W/M, while maintaining the tilt angle of mirror 302-2 at θ1. In the depicted example, therefore, at operation 606, the spectrum of output signal 108 shifts to shorter wavelengths by one micron while maintaining the same spectral width.

At operation 604, output optical signal 108-*i* is provided to detector array 104. As a result, detectors 110 detect wavelength signals that span the range from 20.0 microns to 19.001 microns with a spectral resolution of 1 nm.

At operation 605, output signals 112-*i* are provided to processor 114.

For each value of i operations 603 through 605 are repeated.

At operation 606, processor 114 determines the spectral content of input optical signal 106 based on output signals 112-1 through 112-M.

Figure 7:
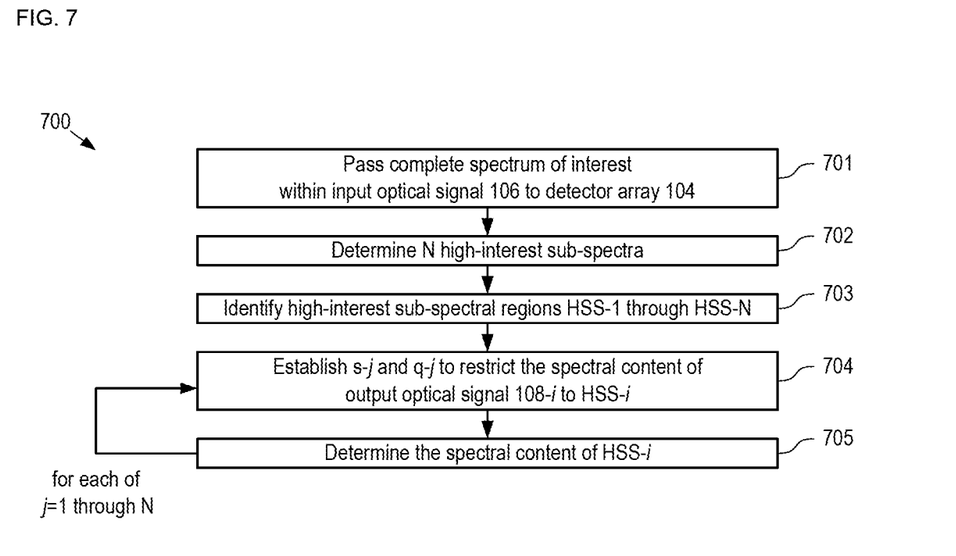
FIG. 7 depicts operation of a second exemplary method for determining the spectral content of a light signal in accordance with the present invention.

FIG. 7 depicts operation of a second exemplary method for determining the spectral content of a light signal in accordance with the present invention. Method 700 is described herein with continuing reference to FIGS. 1, 3, and 4. Method 700 enables a wide spectral range of light to be quickly measured at low resolution to identify spectral regions within it that warrant measurement at higher resolution. Method 700, therefore, provides a "spectral zoom" capability that enables a user to quickly identify and analyze only those portions of the larger spectrum signal that are deemed critical.

Method 700 begins with operation 701, wherein a complete spectrum of interest within input optical signal 106 is passed by spectral filter 102 as output optical signal 108. In the depicted example, the spectrum of interest is the entire MIR spectral range. To pass the entire spectrum of interest, a first, typically large, tilt angle, θ2 is established for mirror 302-2.

At operation 702, processor 114 identifies N high-interest sub-spectral regions, HSS-1 through HSS-N, within the spectrum of interest based on output signals 112 from detectors 110.

At operation 703, for each of j=1 through N, spacing s-j and tilt angle θ-j are established such that the spectral content of output optical signal 106 is set to HSS-j.

At operation 704, for each of j=1 through N, processor 114 determines the spectral content of HSS-j.

In some embodiments, the high-resolution measurement of at least one high-interest spectrum reveals one or more smaller spectral regions that warrant analysis with even higher spectral resolution. In such cases, for each of these smaller spectral regions, spacing s and tilt angle θ can be re-established such that output optical signal 108 distributes only its spectrum across detectors 110. It should be noted that this spectral "zooming" process can be repeated until the practical limit on the control resolution of actuators 402-1 and 402-2 is reached.

In some embodiments, once a specific absorption peak of interest in identified (e.g., in operation 702). The cavity length of cavity 304 is adjusted to transmit just the wavelength of this absorption peak across the width of the optically resonant cavity. As a result, each of detectors 110 senses the same wavelength, thereby converting system 100 into a spectral-imaging camera.

As discussed above, hyperspectral detection systems have found widespread use in many applications, such as hyperspectral imaging and spectroscopy. Embodiments of the present invention are particularly well suited for use in high-resolution spectroscopy due to the ability to operate in the MIR spectral range.

Figure 8:
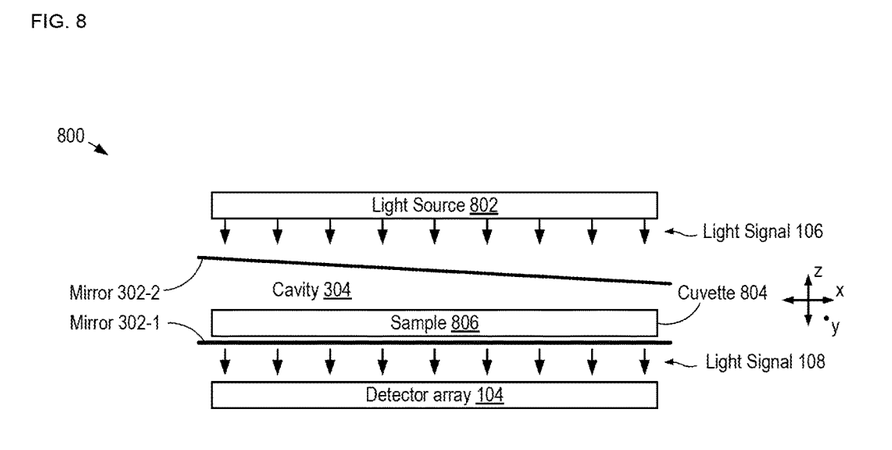
FIG. 8 depicts a schematic drawing of a cross-sectional view of a high-resolution spectrometer in accordance with the present disclosure.

FIG. 8 depicts a schematic drawing of a cross-sectional view of a high-resolution spectrometer in accordance with the present disclosure. Spectrometer 800 includes spectral filter 102, detector array 104, light source 802, and sample cuvette 804.

Light source 802 is a radiation source operative for providing light signal 106.

Sample cuvette 804 is a chamber suitable for holding a test sample 806, which is typically a fluid such as blood, spittle, etc. In the depicted example, sample 806 is blood.

It should be noted that prior-art spectrometers—particularly compact spectrometers—often suffer from limited sensitivity because the material being analyzed does not absorb efficiently and the path length of light through the sample is not long enough. Longer path lengths limit miniaturization and complicate the optical filter response by allowing multiple wavelengths to resonate within the system.

The depicted example is afforded significant advantage over prior-art spectrometers, however, due to the fact that sample cuvette 804 is located in cavity 304 formed by mirrors 302-1 and 302-2.

As a result, the absorption peaks in sample 806 are optically amplified and the geometry of system 800 enables the measurement and quantification of trace amounts of material within cavity 304. It should be noted that the amplification of the light absorption by the quality factor, Q, of cavity 304, which can easily exceed 2000, will enable the improvement of the sensitivity by this factor. Consequently, the contrast of the spectrum is markedly increased by locating sample 806 within the optical hyperspectral filtering cavity of spectral filter 102.

In some embodiments, cavity 304 is oriented at a non-normal angle relative to the propagation direction of input optical signal 106 (i.e., α≠90°) such that both of mirrors 302 are at a non-right angle to axis A1 when the spectral filter is in its quiescent state. In such embodiments, the resonant peak position of cavity 304 is shifted according to the cosine of angle α and the spectral range of light transmitted through the cavity in its quiescent state is narrowed. As a result, the quality factor, Q, of cavity 304 is improved, thereby markedly improving the sensitivity of spectrometer 800.

It should be noted that, while this improvement is described here as it relates to spectrometer 800, improvement in system performance arising due to orienting cavity 304 at a non-normal angle relative to the propagation direction of input optical signal 106 affords advantages in other embodiments in accordance with the present disclosure.

It should be noted that, while location of sample 806 in the optically resonant cavity is highly advantageous, the sample can also be located between light source 802 and spectral filter 102, or between spectral filter 102 and detector array 104, without departing from the scope of the present disclosure.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising a spectral filter that is operative for receiving a first light signal characterized by a first spectral range and providing a second light signal that is spectrally dispersed along a first direction, wherein the second light signal is characterized by a second spectral range within the first spectral range, and wherein the spectral filter includes:

a first mirror that is planar and partially transmissive for the first light signal;

a second mirror that is planar and partially transmissive for the first light signal, wherein the first mirror and second mirror define an optically resonant cavity having a cavity length that is controllable along the first direction; and a first actuator that is configured to control a first separation between the first mirror and second mirror at a first location, wherein a first angle of the first mirror relative to the second mirror along the first direction is based on the first separation;

wherein the second spectral range has a first spectral width that is based on the first angle; and wherein the spectral filter is configured such that, when the first light signal propagates along a second direction and the spectral filter is in its quiescent state, each of the first mirror and second mirror is oriented at a second angle relative to the second direction, and wherein the second angle is not equal to 90°.

2. The apparatus of claim 1 wherein the spectral filter is operative for providing the second light signal such that it is also spectrally dispersed along a second direction that is orthogonal with the first direction, the second light signal being characterized by a third spectral range along the second direction, and wherein the spectral filter further includes a second actuator that is configured to control a second angle of the first mirror relative to the second mirror along the second direction, and further wherein the third spectral range has a second spectral width that is based on the second angle.

3. The apparatus of claim 1 further comprising a second actuator that is configured to control a second separation between the first mirror and second mirror at a second location, wherein the second separation defines one of the minimum wavelength and maximum wavelength of the second spectral range.

4. The apparatus of claim 1 wherein the second mirror is a Bragg mirror that comprises a plurality of layers of a first material, wherein each pair of adjacent layers of the plurality thereof is separated by an air gap.

5. The apparatus of claim 1 wherein the second spectral range includes at least a portion of the mid-infrared spectral range.

6. The apparatus of claim 1 further comprising a plurality of detectors that is configured to receive the second light signal from the spectral filter, wherein the spectral filter and plurality of detectors are arranged such that each detector of the plurality thereof receives a different wavelength signal of a plurality of wavelength signals that are characterized by different wavelengths within the second spectral range.

7. The apparatus of claim 6 further comprising:

a light source for providing the first light signal; and a sample chamber for containing a sample;

wherein the light source, the spectral filter, and the sample chamber are dimensioned and arranged such that the plurality of detectors receives the plurality of wavelength signals after the plurality of wavelength signals have passed through the sample chamber.

8. The apparatus of claim 7 wherein the sample chamber is located between the first mirror and second mirror.

9. An apparatus comprising a spectral filter that is operative for receiving a first light signal characterized by a first spectral range and providing a second light signal that is spectrally dispersed along a first direction, wherein the second light signal is characterized by a second spectral range within the first spectral range, and wherein the spectral filter includes:

a first mirror that is planar and partially reflective for the first light signal;

a second mirror that is planar and partially reflective for the first light signal, wherein the second mirror is moveable with respect to the first mirror, and wherein the second mirror is parallel with the first mirror when the spectral filter is in its quiescent state; and a first actuator that is configured to control a first angle between the first mirror and the second mirror along a first direction, wherein the second spectral range has a first spectral width that is based on the first angle;

wherein the spectral filter is configured such that, when the first light signal propagates along a second direction and the spectral filter is in its quiescent state, each of the first mirror and second mirror is oriented at a second angle relative to the second direction, and wherein the second angle is not equal to 90°.

10. The apparatus of claim 9 wherein the spectral filter further includes a second actuator that is configured to control one of the minimum wavelength and maximum wavelength of the second spectral range.

11. The apparatus of claim 10 wherein the first actuator is configured to control a first separation between the first mirror and second mirror at a first location, the first angle being based on the first separation, and wherein the second actuator is configured to control a second separation between the first mirror and second mirror at a second location, the one of the minimum wavelength and maximum wavelength of the second spectral range being based on the second separation.

12. The apparatus of claim 9 wherein the second mirror is a Bragg mirror that comprises a plurality of layers of a first material, wherein each pair of adjacent layers of the plurality thereof is separated by an air gap.

13. The apparatus of claim 9 wherein the second spectral range includes at least a portion of the mid-infrared spectral range.

14. The apparatus of claim 9 further comprising a plurality of detectors that is configured to receive the second light signal from the spectral filter, wherein the spectral filter and plurality of detectors are arranged such that each detector of the plurality thereof receives a different wavelength signal of a plurality of wavelength signals that are characterized by different wavelengths within the second spectral range.

15. The apparatus of claim 14 further comprising:

a light source for providing the first light signal; and a sample chamber for containing a sample;

wherein the light source, the spectral filter, and the sample chamber are dimensioned and arranged such that the plurality of detectors receives the plurality of wavelength signals after the plurality of wavelength signals have passed through the sample chamber.

16. The apparatus of claim 15 wherein the sample chamber is located between the first mirror and second mirror.

17. A method comprising:

(1) receiving a first light signal at a spectral filter that is characterized by a first spectral range, wherein the spectral filter includes:

(i) a first mirror that is planar and partially transmissive for the first light signal; and (ii) a second mirror that is planar and partially transmissive for the first light signal, wherein the second mirror has a first angle relative to the first mirror along a first direction, and wherein the first angle is controllable;

wherein the first and second mirror define an optically resonant cavity having a cavity length that is a first linear function of position along the first direction;

wherein the first light signal is received along a second direction, and wherein, when the spectral filter is in its quiescent state, each of the first and second mirrors is oriented at a second angle relative to the second direction, and further wherein the second angle is not equal to 90°;

(2) controlling the first angle such that it has a first magnitude; and (3) providing a second light signal from the spectral filter such that it is spectrally dispersed along the first direction, the second light signal being characterized by a second spectral range that is within the first spectral range, the second spectral range having a first spectral width that is based on the first magnitude.

18. The method of claim 17 further comprising (4) controlling a first separation between the first and second mirrors at a first location such that the first separation has a second magnitude, wherein one of the maximum wavelength and minimum wavelength of the second spectral range is based on the second magnitude.

19. The method of claim 17 further comprising (4) providing the spectral filter such that at least one of the first mirror and second mirror is a Bragg mirror that includes a plurality of layers of a first material, wherein each pair of adjacent layers of the plurality thereof is separated by an air gap.

20. The method of claim 17 wherein the second spectral range includes at least a portion of the mid-infrared spectral range.

21. The method of claim 17 further comprising:
(4) receiving the second light signal at a plurality of detectors arranged along the first direction such that each detector of the plurality thereof receives a different wavelength signal of a first plurality of wavelength signals that are characterized by different wavelengths within the second spectral range; and
(5) providing a first plurality of output signals, wherein each output signal of the first plurality thereof is based on the magnitude of a different wavelength signal of the first plurality thereof.

22. The method of claim 21 further comprising:
(6) providing a sample such that it is located between a light source and the plurality of detectors, wherein the light source is operative for providing the first light signal, and wherein the second light signal is received at the plurality of detectors after the second light signal has passed through a sample; and
(7) determining property of the sample based on the plurality of output signals.

23. The method of claim 22 wherein the sample is provided such that it is located between the first mirror and second mirror.

24. The method of claim 17 further comprising:
(4) controlling the first angle such that it has a second magnitude; and
(5) providing a third light signal from the spectral filter such that it is spectrally dispersed along the first direction, the third light signal being characterized by a third spectral range that is within the first spectral range, and the third spectral range having a second spectral width that is based on the second magnitude, wherein the first spectral width and second spectral width are different.

25. The method of claim 24 further comprising:
(6) receiving the second light signal at a plurality of detectors arranged along the first direction such that each detector of the plurality thereof receives a different wavelength signal of a first plurality of wavelength signals that are characterized by different wavelengths within the second spectral range;
(7) providing a first plurality of output signals, wherein each output signal of the first plurality thereof is based on the magnitude of a different wavelength signal of the first plurality thereof;
(8) receiving the third light signal at the plurality of detectors such that each detector of the plurality thereof receives a different wavelength signal of a second plurality of wavelength signals that are characterized by different wavelengths within the third spectral range, wherein the first plurality of wavelength signals and second plurality of wavelength signals have different spectral resolutions; and
(9) providing a second plurality of output signals, wherein each output signal of the second plurality thereof is based on the magnitude of a different wavelength signal of the second plurality thereof.

26. The method of claim 17 further comprising:
(4) controlling a first separation between the first and second mirrors at a first location such that the first separation has a second magnitude, wherein one of a first maximum wavelength and first minimum wavelength of the second spectral range is based on the second magnitude;
(5) receiving the second light signal at a plurality of detectors arranged along the first direction such that each detector of the plurality thereof receives a different wavelength signal of a first plurality of wavelength signals that are characterized by different wavelengths within the second spectral range; and
(6) providing a first plurality of output signals, wherein each output signal of the first plurality thereof is based on the magnitude of a different wavelength signal of the first plurality thereof.

27. The method of claim 26 further comprising:
(7) controlling the first separation such that it has a third magnitude;
(8) providing a third light signal from the spectral filter such that it is spectrally dispersed along the first direction, the third light signal being characterized by a third spectral range that is within the first spectral range, wherein one of a second maximum wavelength and second minimum wavelength of the third spectral range is based on the third magnitude;
receiving the third light signal at the plurality of detectors such that each detector of the plurality thereof receives a different wavelength signal of a second plurality of wavelength signals that are characterized by different wavelengths within a third spectral range; and
(9) providing a second plurality of output signals, wherein each output signal of the second plurality thereof is based on the magnitude of a different wavelength signal of the second plurality thereof.

28. The method of claim 27 further comprising (10) controlling the first angle such that it has a fourth magnitude, wherein the third spectral range has a second spectral width that is based on the fourth magnitude, and wherein the first plurality of wavelength signals and second plurality of wavelength signals have different spectral resolutions.

\* \* \* \* \*